United States Patent
Lambert et al.

(10) Patent No.: US 7,581,133 B2
(45) Date of Patent: Aug. 25, 2009

(54) SYSTEM AND METHOD OF PROVIDING REAL TIME TO DEVICES WITHIN A SERVER CHASSIS

(75) Inventors: Timothy M. Lambert, Austin, TX (US); Babu K. Chandrasekhar, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 540 days.

(21) Appl. No.: 11/499,631

(22) Filed: Aug. 4, 2006

(65) Prior Publication Data

US 2008/0034239 A1 Feb. 7, 2008

(51) Int. Cl.
*G06F 15/16* (2006.01)
(52) U.S. Cl. .................. 713/601; 703/600; 703/601; 709/231; 709/232; 709/233; 709/238
(58) Field of Classification Search .......... 713/600, 713/601; 709/231–233, 238
See application file for complete search history.

(56) References Cited

U.S. PATENT DOCUMENTS

| | | | | |
|---|---|---|---|---|
| 5,912,621 A | * | 6/1999 | Schmidt | 340/571 |
| 5,974,573 A | * | 10/1999 | Martin | 714/48 |
| 7,197,657 B1 | * | 3/2007 | Tobias | 713/400 |
| 7,293,102 B2 | * | 11/2007 | Emerson | 709/232 |
| 2004/0003123 A1 | * | 1/2004 | Kwon | 709/248 |
| 2004/0073834 A1 | * | 4/2004 | Kermaani et al. | 714/13 |
| 2005/0080887 A1 | * | 4/2005 | Lee et al. | 709/223 |
| 2005/0138348 A1 | * | 6/2005 | Bolay et al. | 713/100 |
| 2007/0255430 A1 | * | 11/2007 | Sharma et al. | 700/20 |

* cited by examiner

*Primary Examiner*—Abdelmoniem Elamin
(74) *Attorney, Agent, or Firm*—Larson Newman & Abel, LLP

(57) ABSTRACT

An information management system is disclosed and can include a server chassis having a chassis control panel. The chassis control panel can include a real time clock. Further, the system can include a chassis management controller connected to the chassis control panel. The chassis management controller can include logic to determine whether the chassis management controller is active and logic to read a time from the real time clock when the chassis management controller is active. The system can also include a chassis device removably engaged with the server chassis. The chassis device can include logic to load a time protocol client when the chassis device boots before chassis device is fully booted and to retrieve the time from the time protocol server within the chassis management controller. Accordingly, the chassis device can detect when an event occurs and time stamp the event before the chassis device fully boots.

17 Claims, 3 Drawing Sheets

SYSTEM AND METHOD OF PROVIDING REAL TIME TO DEVICES WITHIN A SERVER CHASSIS

FIELD OF THE DISCLOSURE

The present disclosure relates generally to distributed file systems. More specifically, the present disclosure relates to providing real time to various devices within a server chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling systems can include a server chassis, or enclosure, in which multiple blade servers can be installed. A typical blade server with a baseboard management controller (BMC) does not have a native real time clock (RTC) and may rely on the basic input/output system (BIOS) associated with the server chassis to get the time. Events that occur before the blade server POSTs to the point where RTC information can be retrieved by the BMC can be logged to a system event log (SEL) associated with a chassis management controller (CMC). However, there are many blade server level failures and chassis level failures that can prevent the blade server from POSTing and retrieving a timestamp from the chassis BIOS. For blade servers that cannot POST, events cannot be time stamped, and it can be substantially impossible to differentiate when events occur.

Additionally, real time synchronization in modular systems between the server chassis BIOS, the blade server BMC, CMC, and various input/output (I/O) modules can be problematic. For example, real time synchronization can be difficult in cases in which blade servers within a single chassis or sold or leased to different customers in different time zones since BMC timestamps would be with respect to each blade server customer time zone and not with respect to the real time within the chassis.

Accordingly, there is a need for an improved system and method of providing real time to blade servers, and other chassis devices, within a server chassis.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

An information management system is disclosed and can include a server chassis and a chassis control panel within the server chassis. The chassis control panel can include a real time clock. Further, the system can include a chassis management controller connected to the chassis control panel. The chassis management controller can include logic to determine whether the chassis management controller is active and logic to read a time from the real time clock when the chassis management controller is active.

In another embodiment, a method of obtaining a real time at a chassis device installed within a server chassis is disclosed. The method can include loading a time protocol client when the chassis device boots and retrieving the real time from an active chassis management controller.

In yet another embodiment, a chassis device is disclosed and can removably engage server chassis. The chassis device can include a device management controller within the chassis device that can have logic to load a time protocol client when the chassis device boots and retrieve the real time from an active chassis management controller.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. For example, much of the following focuses on dynamically changing file types within a distributed file systems. While the teachings may certainly be utilized in this application, the teachings may also be utilized in other applications and with several different types of architectures such as distributed computing architectures, client/server architectures, or middleware server architectures.

Figure 1:
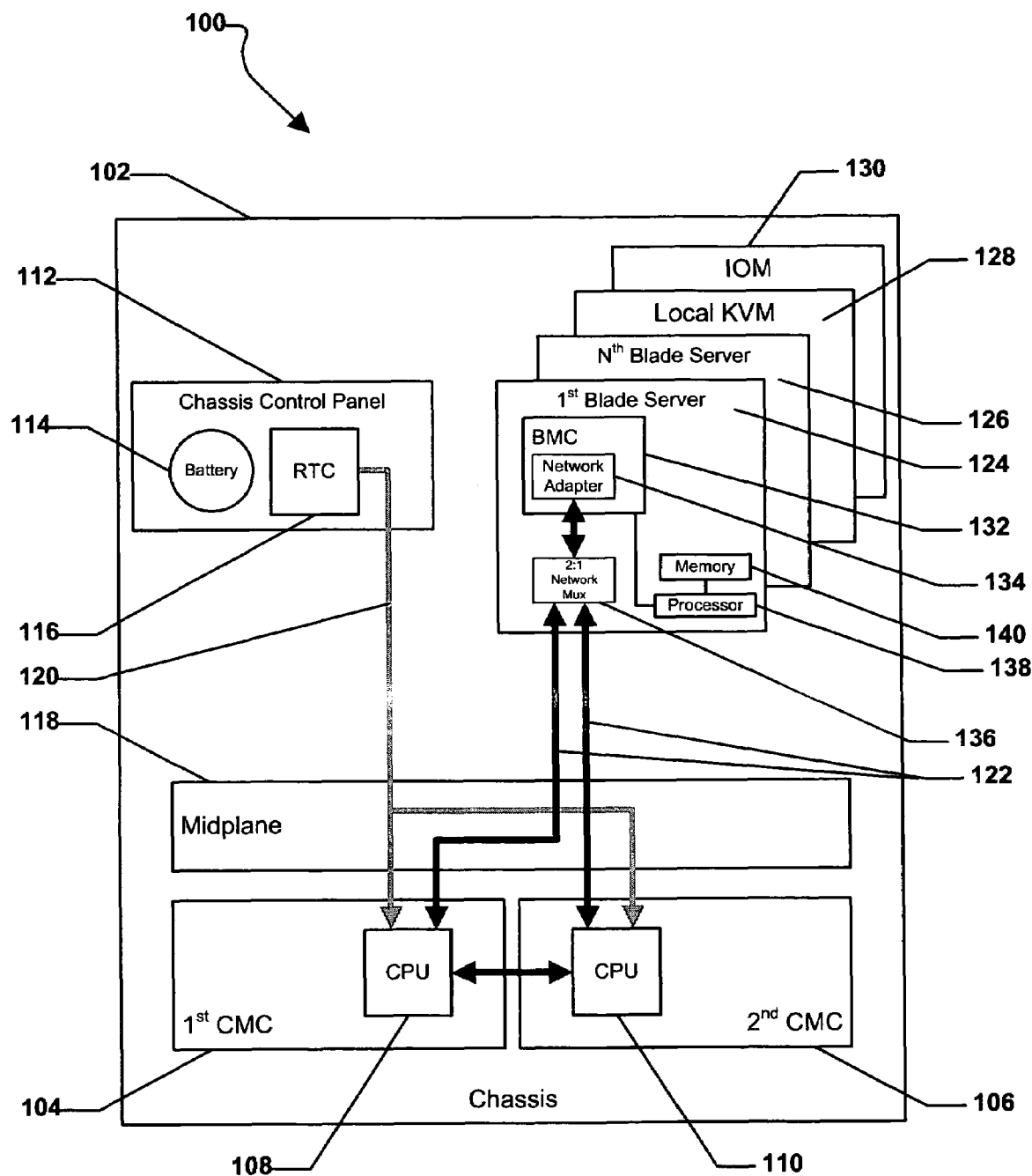
FIG. 1 is a general diagram illustrating an information handling system.

Referring initially to FIG. 1, an information handling system is shown and is generally designated 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In a particular embodiment, as shown in FIG. 1, the information handling system 100 can include a server chassis 102. A first chassis management controller (CMC) 104 and a second CMC 106 can be disposed within the server chassis 102. In a particular embodiment, the first CMC 104 can be active while the second CMC 106 is passive. Alternatively, the second CMC 106 can be active while the first CMC 104 is passive. As indicated in FIG. 1, the first CMC 104 can include a CPU 108 and the second CMC 106 can include a CPU 110. Each CPU 108, 110 can include a time server (not shown). Alternatively, each CPU 108, 110 can be a time server. Further, each CPU 108, 110 can include functionality associated with a time server.

FIG. 1 illustrates that the server chassis 102 can include a chassis control panel 112. The chassis control panel 112 can include a battery 114 and a real time clock (RTC) 116. The RTC 116 within the chassis control panel 112 can be connected to the CPU 108 within the first CMC 104 and the CPU 110 within the second CMC 106 through a midplane 118 via a bus 120. In a particular embodiment, the bus 118 can be an inter-integrated circuit (I2C) bus and the RTC 116 can provide the real time to each CPU 108, 110 using I2C protocol over the I2C bus 120.

In a particular embodiment, various components can be connected to the CPU 108, 110 within each CMC 104, 106 via a local area network (LAN) 122. For example, a first blade server 124, an Nth blade server 126, a local keyboard/video/mouse (LKVM) 128, and an input output module 130 can be connected to the CPU 108, 110 within each CMC 104, 106. Also, in a particular embodiment, the LAN 122 can be an Ethernet. As depicted in FIG. 1, the first blade server 124 can include a device management controller 132, e.g., a baseboard management controller (BMC) that can have a network adapter 134, e.g., an Ethernet adapter. The network adapter 134 can be coupled to a network multiplexer (MUX) 136, e.g., an Ethernet MUX. The first blade server 124 can also include a processor 138 and a memory 140 coupled thereto. The processor 138 can also be coupled to the BMC 132.

In a particular embodiment, the network MUX 136 can connect the first blade server 124 to the CPU 108 within the first CMC 104 and to the CPU 110 within the second CMC 106. Further, the first blade server 124 can communicate with the first CMC 104 or the second CMC 106 via the network 122—depending on which CMC 104, 106 is active. In a particular embodiment, the first blade server 124 can include firmware within the memory 140 for loading a time protocol client when the first blade server 124 boots. The time protocol client can retrieve the real time from the active CMC time protocol time server before the first blade server 124 fully boots. For example, the time can be retrieved initially before the first blade server 124 begins to boot after the first blade server 124 is powered on.

In a particular embodiment, the Nth blade server 126, the LKVM 128, and the IOM 130 can include components similar to one or more of the components described in conjunction with the first blade server 124.

Figure 2:
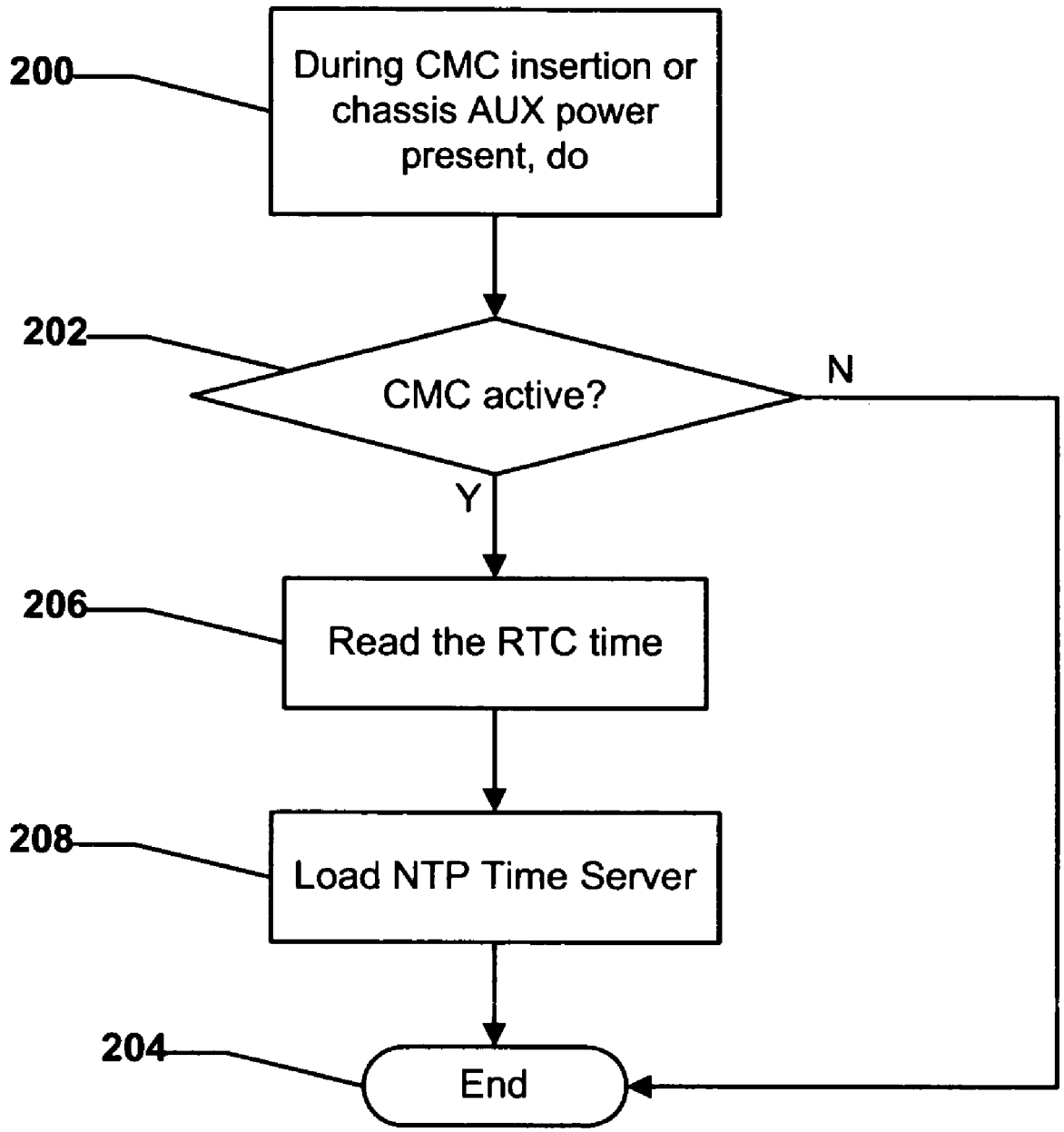
FIG. 2 is a flow chart illustrating a method of providing real time to a chassis management controller (CMC) within a server chassis of an information handling system.

Referring to FIG. 2, a method of providing time to a CMC within a server chassis of an information management system is shown and commences at block 200. At block 200, during CMC insertion or server chassis auxiliary power, the following steps are performed. At decision step 202, the CMC determines whether it is active. If not, the method can end at state 204. Conversely, if the CMC is active, the method can proceed to block 206 and the CMC can read the RTC time from the RTC within the chassis controller. Thereafter, the CMC can load a time protocol time server, e.g., a network time protocol (NTP) time server, with the time from the RTC. The method can then end at state 204.

Figure 3:
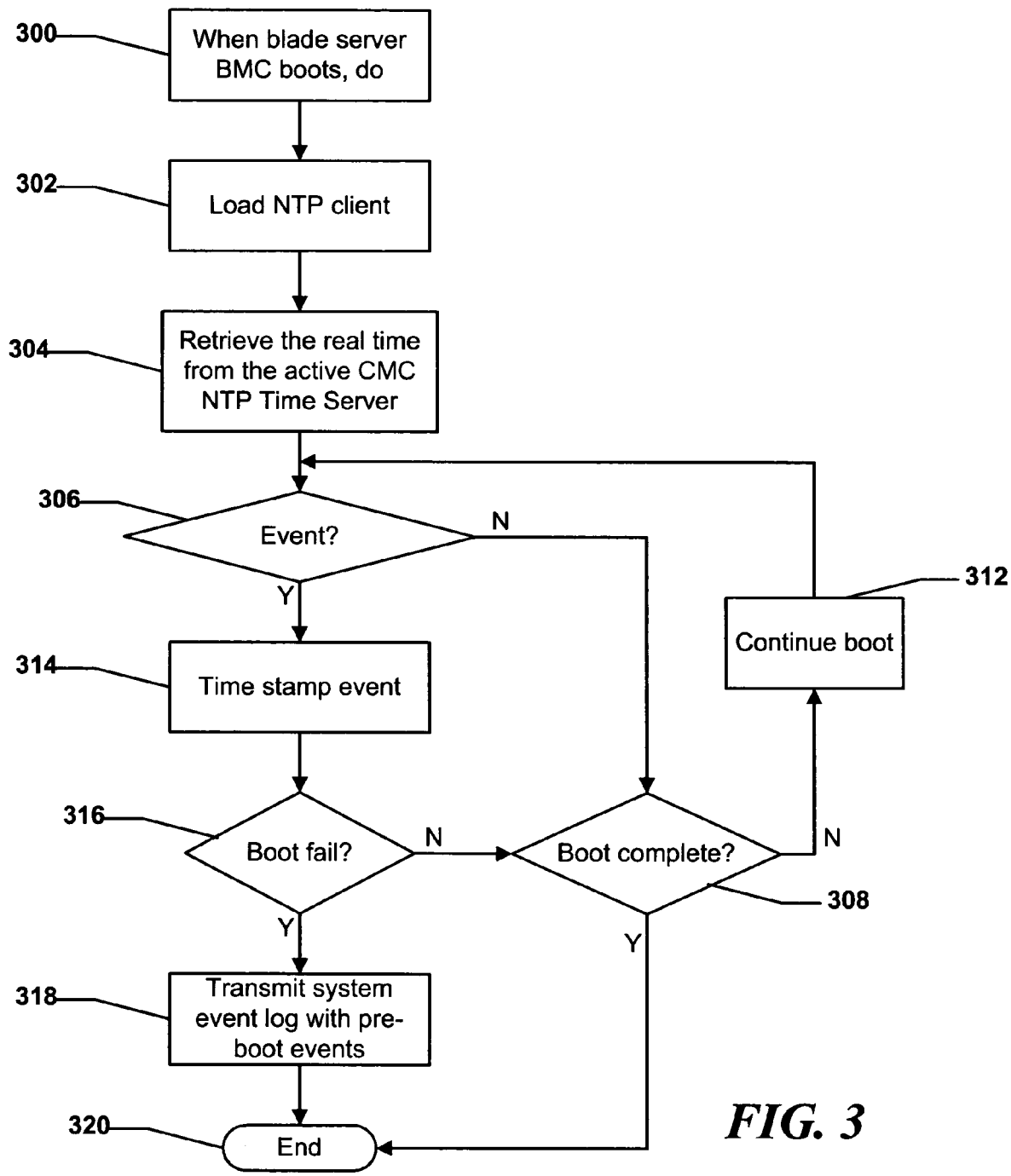
FIG. 3 is a flow chart illustrating a method of providing real time to devices within a server chassis of an information handling system.

FIG. 3 illustrates a method of providing real time to devices, e.g., blade servers or other components, within a server chassis of an information management system. Commencing at block 300, when a blade server BMC boots, the following steps are performed. The following steps can also be performed in other devices when the appropriate device management controller boots. At block 302, firmware within the blade server can load a time protocol client, e.g., an NTP client. At block 304, the time protocol client retrieves the real time from the active CMC time protocol time server.

Moving to block 306, the blade server determines whether an event occurs. If an event does not occur, the method can proceed to decision step 308 and the blade server can determine whether the boot of the blade server is complete. If so, the method can end at state 310. If the boot is not complete, the method can proceed to block 312 and the blade server can continue to boot. Thereafter, the method can return to decision step 306 and continue as described herein.

At decision step 306, when an event occurs, the method can move to block 314 and the blade server can time stamp the event based on the real time retrieved from the active CMC time protocol time server. Continuing to decision step 316, the blade server can determine whether the boot fails. If not, the method can move to decision step 308 and continue as described herein. On the other hand, if the boot fails, the method can move to block 318 and the blade server can transmit a system event log (SEL) with one or more pre-boot events to the CMC. Thereafter, the method can end at state 320. It can be appreciated that the preceding method can also be performed when other devices within the server chassis are installed and energized. The pre-boot events can include thermal events, input errors, system errors, memory errors, or a combination thereof. Further, the pre-boot event can be an error due to a bad CPU voltage regulator down.

With the configuration of structure described herein, a system and method described herein can provide real time to one or more CMC within a server chassis of an information management system. The RTC that provides the time to each CMC can be located in a chassis control panel that is external to each CMC. As such, each CMC does not need a battery or a RTC crystal therein and costs associated with each CMC can be reduced. Moreover, if a CMC is replaced due to failure, or some other reason, the time associated with the server chassis is maintained external to the CMC and a new CMC can be given the correct time when installed. This can maintain consistent chassis event log time stamps during CMC replacement or failover.

Additionally, a system and a method described herein can provide real time to devices, e.g., blade servers, KVMs, IOMs, etc., as they are installed in the server chassis and before they are fully powered on. As such, device management events can be time stamped before a device is fully powered on or if the device does not fully post, e.g., due to an error. Further, a system described herein can provide a time zone offset that can allow different devices to run in different time zones or time settings. For example, firmware in a particular device can retrieve the time from the server chassis and apply an appropriate time zone offset to the time within the device. Furthermore, BIOS RTC can be retrieved from a BMC and as the use of non-volatile CMOS increases, the need for a battery and an RTC crystal in a blade server can be obviated, which can reduce bill of materials (BOM) costs and real estate.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information management system, comprising:
a server chassis;
a chassis control panel within the server chassis, wherein the chassis control panel includes a real time clock;
at least one chassis management controller connected to the chassis control panel, wherein the chassis management controller comprises logic to:
determine whether the at least one chassis management controller is active;
logic to read a time from the real time clock when the chassis management controller is active; and
a chassis device removably engaged with the server chassis wherein the chassis device includes logic to:
load a time protocol client when the chassis device boots before the chassis device is fully booted.

2. The system of claim 1, wherein the chassis management controller further comprises logic to:
load a time protocol server within the chassis management controller with a time from the real time clock.

3. The system of claim 1, wherein the chassis control panel is external to the chassis management controller and the real time clock is external to the chassis management controller.

4. The system of claim 1, wherein the chassis device further comprises logic to:
retrieve the time from the time protocol server within the chassis management controller.

5. The system of claim 4, wherein the chassis device further comprises logic to:
detect when an event occurs; and
time stamp the event before the chassis device fully boots.

6. The system of claim 5, wherein the chassis device further comprises logic to:
transmit a system event log with one or more time stamped events to the chassis management controller when the chassis device fails to fully boot.

7. The system of claim 1, wherein the chassis device comprises a blade server, a video/keyboard/mouse (KVM), an input output module (IOM), or a combination thereof.

8. A method of obtaining a real time at a chassis device installed within a server chassis, comprising:
loading a time protocol client when the chassis device boots;
retrieving the real time from an active chassis management controller; and
detecting when an event occurs; and
time stamping the event before the chassis device fully boots.

9. The method of claim 8, wherein the real time is received from a time protocol time server within the active chassis management controller.

10. The method of claim 8, further comprising:
determining when the chassis device does not fully boot.

11. The method of claim 10, further comprising:
transmitting a system event log with one or more time stamped events to the chassis management controller when the chassis device fails to fully boot.

12. The method of claim 8, wherein the chassis device comprises a blade server, a video/keyboard/mouse (KVM), an input output module (IOM), or a combination thereof.

13. A chassis device configured to removably engage server chassis, comprising:
a device management controller within the chassis device, wherein the device management controller comprises logic to:
load a time protocol client when the chassis device boots;
retrieve the real time from an active chassis management controller; and
detect when an event occurs; and
time stamp the event before the chassis device fully boots.

14. The device of claim 13, wherein the real time is received from a time protocol time server within the active chassis management controller.

15. The device of claim 13, wherein the device management controller further comprises logic to:
determine when the chassis device does not fully boot.

16. The device of claim 15, wherein the device management controller further comprises logic to:
transmit a system event log with one or more time stamped events to the chassis management controller when the chassis device fails to fully boot.

17. The device of claim 13, wherein the chassis device comprises a blade server, a video/keyboard/mouse (KVM), an input output module (IOM), or a combination thereof.

\* \* \* \* \*